June 15, 1965   S. J. RUDY   3,188,661
KNOCKDOWN STRUCTURE FOR USE WITH A CHILD'S
ENCLOSURE, SUCH AS A CRIB
Filed Feb. 7, 1963   3 Sheets-Sheet 1
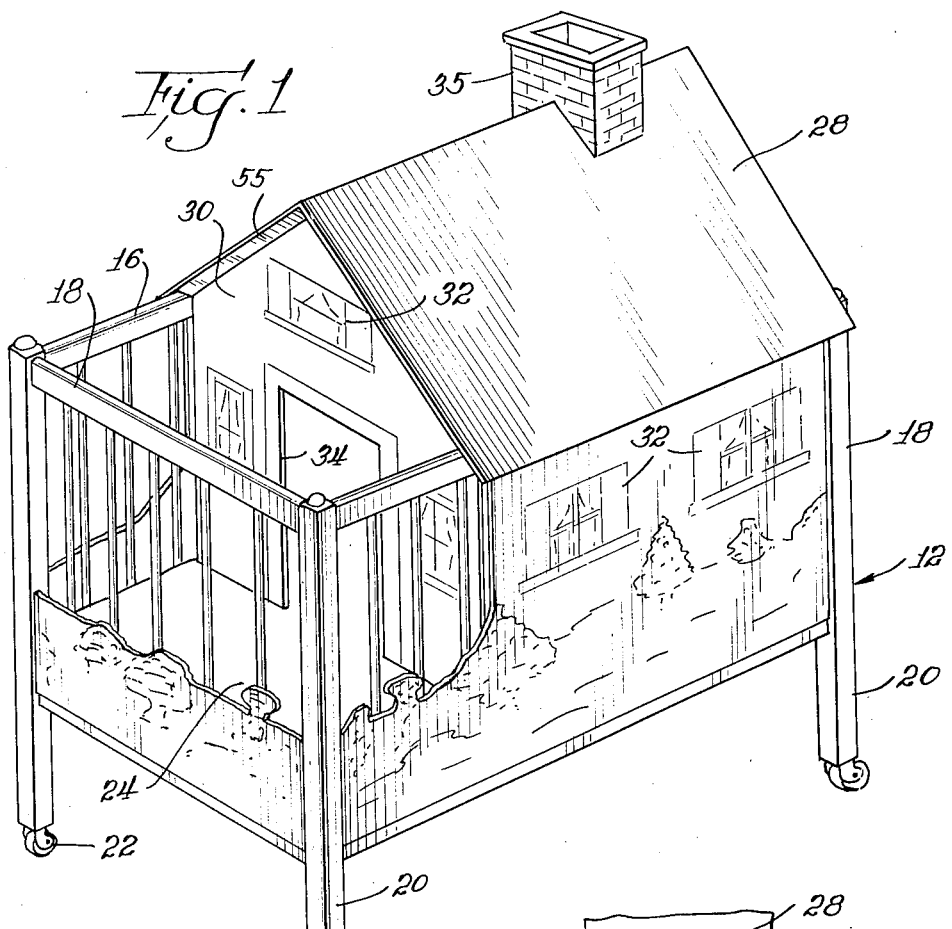
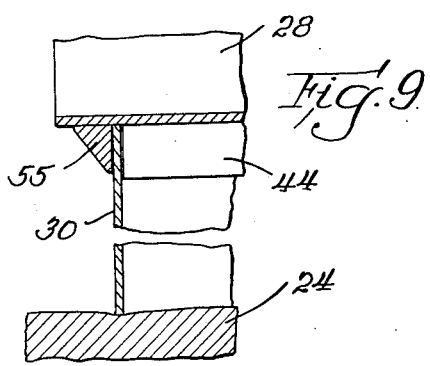
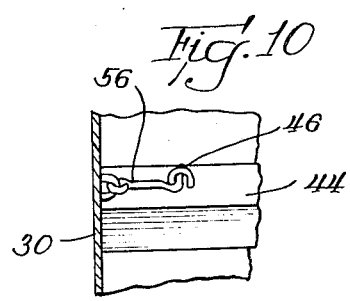
INVENTOR.
Stephen J. Rudy June 15, 1965  S. J. RUDY  3,188,661
KNOCKDOWN STRUCTURE FOR USE WITH A CHILD'S
ENCLOSURE, SUCH AS A CRIB
Filed Feb. 7, 1963  3 Sheets-Sheet 2
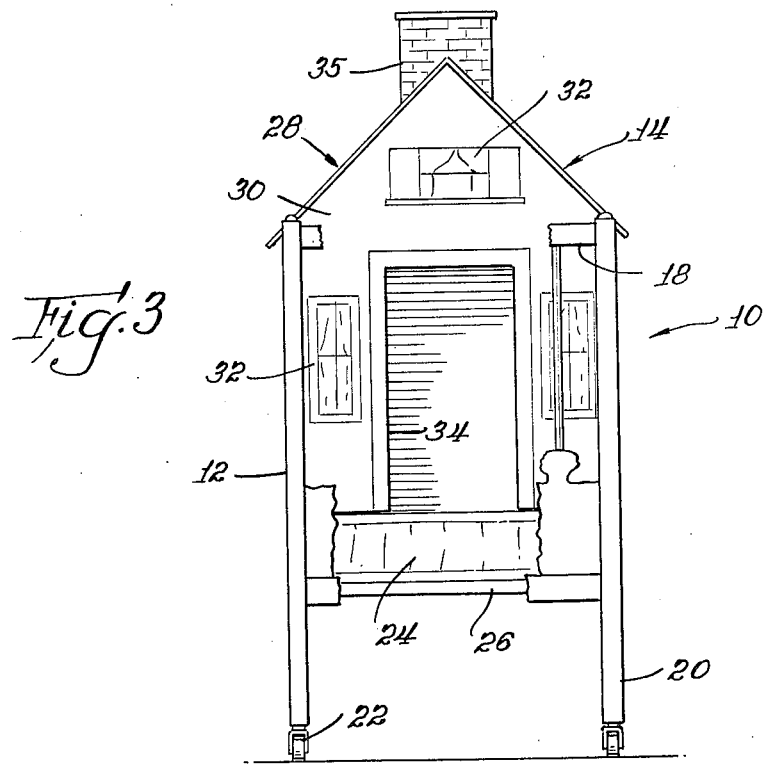
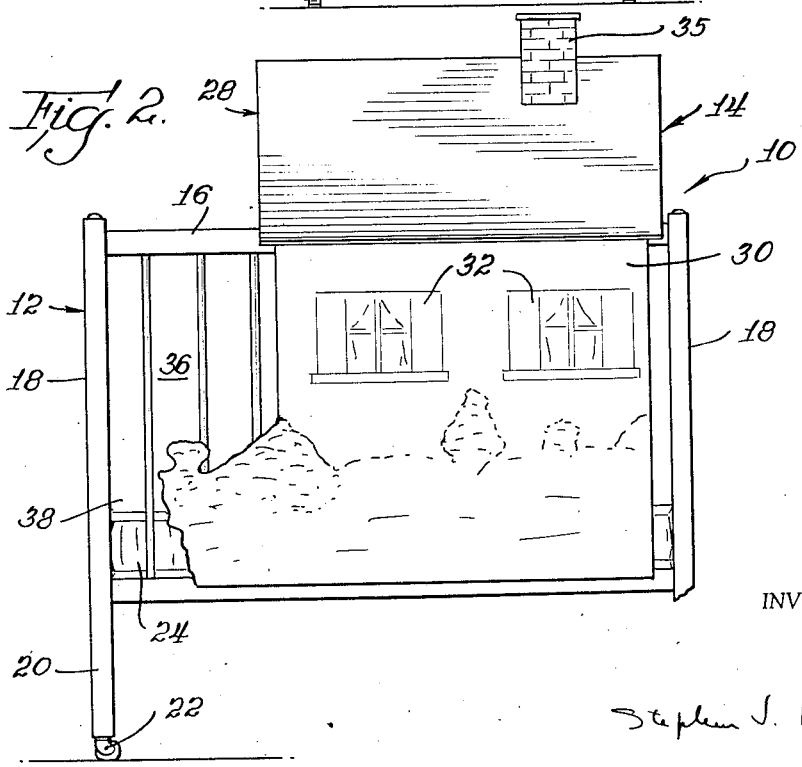
INVENTOR.
Stephen J. Rudy June 15, 1965                S. J. RUDY                3,188,661
KNOCKDOWN STRUCTURE FOR USE WITH A CHILD'S
ENCLOSURE, SUCH AS A CRIB
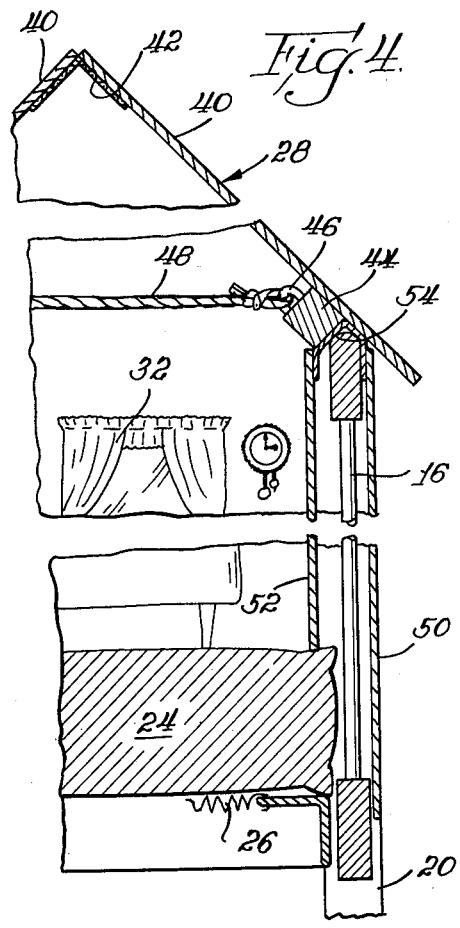
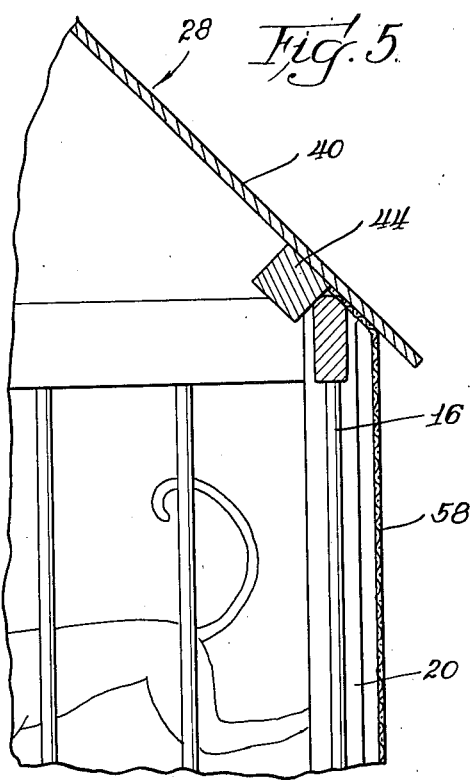
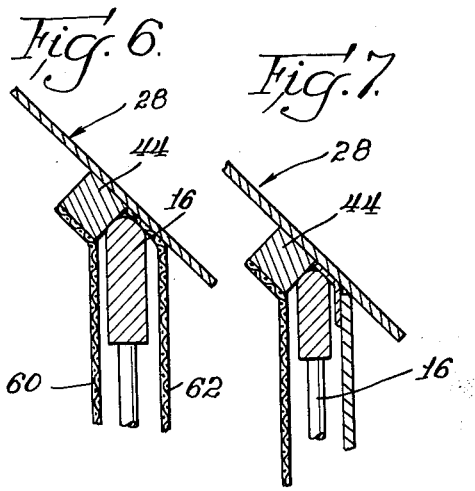
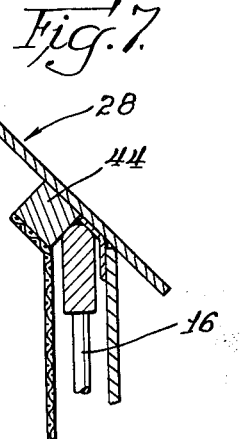
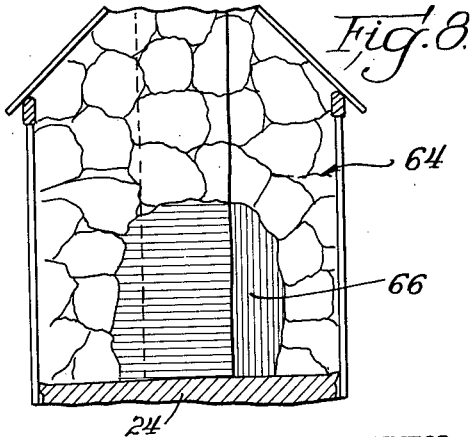
INVENTOR.
Stephen J. Rudy United States Patent Office 3,188,661
Patented June 15, 1965

3,188,661
KNOCKDOWN STRUCTURE FOR USE WITH A CHILD'S ENCLOSURE, SUCH AS A CRIB
Stephen J. Rudy, Evanston, Ill.
(107 Overlook Drive, Greenwich, Conn.)
Filed Feb. 7, 1963, Ser. No. 257,043
15 Claims. (Cl. 5—97)

This invention relates to a knockdown structure for use with a child's enclosure, such as a crib, or playpen, which structure will afford prolonged amusement and contentment to a child.

It is a well recognized fact that children of tender age, say, from two to seven years, are fond of crawling into enclosures, such as tents, or make-shift houses formed of blankets, cardboard, etc., and spend many contented hours playing in such manner.

It is also a well recognized fact that it is often difficult to make a child take a nap, or retire for the night, when he would rather play, or be about, and it becomes progressively more difficult as the child passes the age of three years, albeit he very often needs such a rest during the day, or nightly retirement at an appropriate hour. And, of course, it often happens that the child's nap, or nightly retirement is as much a blessing, or benefit to an overworked and/or conscientious parent, as it is to the child.

The present invention utilizes these well known facts to provide a novel concept, the physical embodiment of which affords prolonged amusement and contentment to a child, with the bestowal of attendant benefits on an overworked and/or conscientious parent.

More specifically, the inventive concept relates to the provision of a knockdown structure, in the form of a house, castle, fort, steam locomotive, space-craft, or the representation of any known body of which children are fond, or to which they may be attracted, which structure may be conveniently placed over, or supported by, a crib, or playpen.

It will be found that the child takes great delight in playing within such a structure when placed about his crib, or playpen. Not only does it provide him with a sense of privacy, and the satisfaction of being "lord and master" of his little domain, but provides a sheltered area having a degree of sound and light insulating qualities, which induce relaxation and sleep, especially when the need therefor exists.

The main object of this invention is to provide a knockdown structure for use with a child's enclosure, such as a crib, or playpen, which structure will afford prolonged amusement and contentment to a child.

Another object of this invention is to provide a knockdown structure for use with a child's enclosure, such as a crib, which structure will function to induce a child to stay in his crib so that he will play peacefully and/or fall asleep when such sleep is required, as at nap, or bedtime.

Still another object is to provide a knockdown structure for use with a child's crib, which structure is of light weight, of sturdy design to provide long service, and which can be manufactured simply, and at a low cost.

These and further objects and features of the invention will become more apparent from the following description and accompanying drawings wherein:

FIG. 1 is a perspective view of a child's crib upon which a house structure embodying the principles of the invention has been mounted;

FIG. 2 is a side view of the same;

FIG. 3 is an end view of the arrangement shown in FIG. 2, but with a portion of the crib being removed;

FIG. 4 is a vertical fragmentary section view of a child's crib and a structure of the invention, having inner and outer wall sections made of rigid light weight material;

FIG. 5 is similar to that of FIG. 4, but shows a modified embodiment having an outer wall section made of cloth;

FIG. 6 is a vertical fragmentary section view similar to FIG. 5, but showing an inner and outer wall section made of cloth;

FIG. 7 is a vertical fragmentary section view similar to FIG. 5, but showing an inner wall section made of cloth and an outer wall section made of a rigid light weight material;

FIG. 8 is an end view similar to that of FIG. 3, and showing a structure which simulates a stone house, or cave, and which has a drop-cloth doorway;

FIG. 9 is a fragmentary view illustrating the manner in which end walls of the house structure may be maintained in position; and FIG. 10 is a view similar to FIG. 9, but illustrating a modified arrangement relative to such detail.

Referring now to the drawings, and more particularly to FIGS. 1 to 3, numeral 10 identifies an arrangement including a child's crib 12, and a house structure 14 illustrative of an embodiment of the invention. The crib 12 may be any one of the types available on the market, having barred walls, or sides 16, either or both of which may be movable vertically for positional adjustment, relative to end walls, or sides 18, the latter of which may incorporate legs 20 mounted upon casters 22. The end walls 18, may have bars similar to those of the side walls 16, or may be of solid construction. A mattress 24 is supported upon a spring 26, which is removably affixed to the crib walls in any one of several ways (not shown), well known to those skilled in the art of crib design.

The house structure 14 includes a gable roof portion 28, and wall portions 30, which are arranged to cover the crib sides 16, as well as be arranged at both ends of the house structure, so that a rectangular structure is provided. The roof portion 28 and wall portions 30, are preferably formed of a substantially rigid light weight material such as, pressboard, corrugated paperboard, sheet plastic of either solid or foam type, Masonite, Beaverboard, plywood, or any equivalent sheet material which will afford strength, while being light enough for easy handling. The wall portions 30, may have openings forming windows 32, with curtains and/or shades if so desired, or may be painted to simulate such windows. An opening forming a doorway 34, is provided in the front end wall 30, whereby entrance and egress may be had to the house structure by the child. The wall portions 30, and roof 28, are preferably painted, or colored in a gay and suggestive manner to add to the illusion of a cozy bungalow, or cottage. If desired, a removable chimney 35, made of material similar to that of the roof 28, may be placed upon the roof to complete the illusion. It will be noted that the length of the house structure 14, is less than the length of the crib to thereby provide a yard area 36 at one end of the crib, which not only affords the child an entry area for the house, but adds to the illusion, especially if strips 38 of cardboard, or equivalent, are placed about the yard area, which strips are colored to resemble a hedge of flowers, bushes, etc. Of course, the house structure may be made to enclose the entire crib, i.e., the yard area may be eliminated, and access to the house interior may be had by lifting up the roof portion, or a part thereof.

The roof portion 28 includes two similar sheets 40 of material, which as best seen in FIG. 4, are joined at the upper edge by a hinge means 42, which may extend the length of the roof and may be formed of a tape made of plastic, fiberglass, etc., or made of metal, if so desired. Toward the edge of each roof sheet 40 is a support means in the form of a bar 44, which serves as an abutment for resting upon the upper edge of the crib side walls 16, whereby the roof portion 28 may be maintained in position on the crib. The bar 44 may be elongated, i.e., continuous, or may be formed of two or more individual blocks placed in alignment, and affixed to the underside of the roof sheets. An eyelet 46 may be arranged in the bar 44 near each end, whereby a cord, or rod 48 can be connected to the eyelet on the opposite bar (not shown) which will keep the roof portion from collapsing, i.e., flattening out, in event the bar is jarred, or moved upwardly from abutment with the edge of the crib side wall 16, as may happen if the child should bump the roof while in the house structure.

Several types of wall structures are proposed, that shown in FIG. 4, for use adjacent the side walls of the crib, consisting of an outer wall section 50, and an inner wall section 52, both being made of substantially rigid materials as hereinbefore described. In such an arrangement the house end walls may be of only single sheet structure. A hook, or strap means 54 is secured to each of the wall sections at the upper end whereby the wall section may be hung upon the crib side 16, so that the crib side wall is straddled thereby. The strap means 54 may be made of material similar to that used in the formation of the roof hinge 42. The inner wall section 52 may be decorated with figures representative of the inside of a cottage, such as a fireplace, and various room scenes. To maintain the front and rear wall portions of the house in operative position, said wall portions may abut the end of the bars 44, as well as the edge of the inner wall section 52, and may be held in such position by a hook means 56, arranged as shown in FIG. 10, or by abutment with a lip, or bar 55 secured to the underside of the roof sheets, as shown in FIG. 9. Another practical way to maintain the walls 30 in position, is to attach tapes, or cords in appropriate places to the walls whereby they may be tied to the crib structure. Actually, the rear wall 30 of the house structure, opposite the front wall, if a rear wall is used, need not rely upon a hook means such as 56, or an abutment as the bar 55, since it may be maintained in abutment with the adjacent end wall, or side of the crib. In certain arrangements, it may be desirable to connect the end walls 30, which are preferably of single sheet construction, to an inner wall section in a pivotal manner, such as by tape hinges, or equivalent.

It will be noted that the inner wall section 52 is of vertical dimension such as to rest upon the mattress 24, or come close thereto, while the outer wall section 50 extends substantially the full height of the crib side wall 16. This will be the case in other wall sections to be described hereinafter.

In the wall structure shown in FIG. 5, the house walls 58 are formed of cloth, or some equivalent flexible, or pliable material, the exterior surface of which is painted to represent the exterior of a house, as in the manner previously described. The walls 58 may be directly affixed to the underside of the roof sheets 40 for suspension therefrom. With such a wall structure, it may be desirable to paint, or apply, pictures of animals on the interior surface of the wall to simulate a zoo scene, the effect of which will be accentuated by presence of the bars of the crib side walls 16, which will be exposed when viewed from inside of the crib.

In the wall structure of FIG. 6, both the inner wall section 60 and outer wall section 62 are made of cloth, as in the case of wall section 58. A feature of such a wall structure in addition to lower cost and easier storage, is that it provides good ventilation, and affords an easy way to check on a child in the house by simply lifting up the lower edge of the wall.

In the wall structure of FIG. 7, the outer wall section is made of a substantially rigid material, as in the case of wall section 50, while the inner wall section is made of cloth, as in the case of inner wall section 60.

A house structure 64 depicted in FIG. 8, is similar to the house structures disclosed above, the only difference being that the structure 64 is painted to represent a stone cottage, or a cave, in which an overlapping cloth door 66 is provided. Such a house structure should appeal to children having primeval instincts, or where the urge to hibernate, like a bear, is prevalent.

It will be seen that the house structures above described, may be easily mounted upon a crib, or playpen, and readily removed therefrom and collapsed for convenient storage. In collapsed form, the parts of the house will occupy very little space, and may be placed in folded condition between the crib and an adjacent wall where it is readily available when desired.

It will be noted that the hinged roof section afford easy lifting of one of said sections whereby the child may be observed, or serviced, when necessary. Of course, it may be desirable, especialy if the house structure is to be mounted for long periods of utilization, to make the roof portion of solid construction, that is, eliminate the hinge arrangement. A solid roof of such type, could be nicely formed of a foam plastic material, such as the polymeric type, for example polystyrene, which is of light weight, and has good strength for the purpose even when of rather narrow gauge.

While the house structures above described have been shown, or related for cooperative use with a crib, it is apparent that they may be so designed, or proportioned, as to find similar use with a playpen.

It will be seen from the foregoing that the disclosed structures will satisfy all of the objectives set forth hereinbefore.

The foregoing description has been given in detail without thought of limitation since the inventive principles involved are capable of assuming other forms without departing from the spirit of the invention or the scope of the following claims.

What is claimed is:

1. A knockdown house structure for use with a crib including side and end walls, said house structure having a pair of side walls arranged to be in juxtaposition with the side walls of said crib and substantially of the same vertical dimension as said crib side walls, said house structure side walls being of less longitudinal horizontal dimension than said crib side walls, and a roof supported above said house structure side walls by means of an abutment which is arranged to rest upon the top edge of said crib side walls, said roof being of less horizontal longitudinal dimension than said crib side walls and being spaced from one of said crib end walls to provide means allowing passage of a child in or out of said crib.

2. A knockdown house structure for use with a crib having a mattress, said structure having a pair of side walls arranged to be in juxtaposition with the sides of said crib and substantially of the same vertical dimension as said crib sides, said side walls being of less longitudinally horizontal dimension than said crib sides, a roof supported above said walls by means of abutments which are secured to said roof adjacent said walls and arranged to rest upon the top edge of said crib sides and a front wall which extends vertically down from the roof with the lower edge substantially adjacent the top of the crib mattress, said roof and front wall being spaced from the crib end wall to provide means allowing passage of a child in or out of said crib, said front wall being formed to provide an opening of sufficient size to allow a child to crawl therethrough.

3. A knockdown house structure according to claim 2, wherein said roof is formed of two similar sheets which are hinged along a line so that the sheets may be folded together.

4. A knockdown house structure according to claim 2, wherein each of the pair of walls includes an inner and an outer wall section for enclosing a side of the crib.

5. A knockdown house structure according to claim 2, wherein the walls are provided with window representations.

6. A knockdown house structure according to claim 2, wherein the roof is of the gable type, and a fastening means is extended between the lower ends of the opposite roof sheets.

7. A knockdown house structure according to claim 2, wherein a rear wall is arranged opposite to said front wall, which rear wall extends vertically down from the roof with the lower edge substantially adjacent the top of the crib mattress.

8. A knockdown house structure according to claim 2, wherein the roof, side walls and front wall are made of a stiff light-weight material.

9. A knockdown house structure according to claim 2, wherein the side walls each include an inner and an outer wall which are made of a cloth, and which enclose a crib side.

10. A knockdown house structure according to claim 2, wherein the side walls each include an inner wall made of cloth and an outer wall made of a stiff light-weight material.

11. A knockdown house structure according to claim 2, wherein the side walls are each made of a single sheet of cloth which is arranged for positioning on the outside of a crib side.

12. A knockdown house structure according to claim 11, wherein a representation of zoo animals is provided on the inner surface of the side walls.

13. A knockdown house structure according to claim 2, wherein a yard area is provided between the front wall of the structure and an end wall of the crib, and a make-believe floral hedge is arranged about the periphery of the yard area.

14. A knockdown house structure according to claim 2, wherein said walls and roof are made of a substantially rigid light weight material taken from the group consisting of pressboard, corrugated paperboard, sheet plastic, Masonite, Beaverboard, and plywood.

15. A knockdown house structure according to claim 2, wherein said walls and roof are made of a foam type polymeric plastic.

References Cited by the Examiner
UNITED STATES PATENTS

| | | | |
|---|---|---|---|
| 785,099 | 3/05 | Herbener | 5—97 |
| 842,712 | 1/07 | Schoenhut | 46—13 |
| 989,012 | 4/11 | Hoyt | 5—97 |
| 1,551,666 | 9/25 | Jensen et al. | 46—21 |
| 1,572,630 | 2/26 | Whiteside | 272—1 |
| 2,535,792 | 12/50 | Goodale. | |
| 2,566,790 | 9/51 | Bloomfield | 5—93 |
| 2,732,569 | 1/56 | Rosen. | |
| 3,089,283 | 5/63 | Kirkpatrick. | |

FOREIGN PATENTS

| | | |
|---|---|---|
| 923,564 | 2/47 | France. |

RICHARD C. PINKHAM, *Primary Examiner.*